US012722731B2

(12) United States Patent
Ishii

(10) Patent No.: US 12,722,731 B2
(45) Date of Patent: Sep. 1, 2026

(54) COWLING STRUCTURE

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 330 days.

(21) Appl. No.: 18/397,067

(22) Filed: Dec. 27, 2023

(65) Prior Publication Data

US 2024/0262445 A1 Aug. 8, 2024

(30) Foreign Application Priority Data

Feb. 2, 2023 (JP) ................................ 2023-014341

(51) Int. Cl.
*B62J 17/02* (2006.01)
*B62J 41/00* (2020.01)

(52) U.S. Cl.
CPC ................ *B62J 17/02* (2013.01); *B62J 41/00* (2020.02)

(58) Field of Classification Search
CPC ............. B62J 17/02; B62J 17/06; B62J 41/00
USPC ................................................ 296/77.1, 78.1
See application file for complete search history.

(56) References Cited

U.S. PATENT DOCUMENTS 10,351,197 B2 * 7/2019 Kaji ........................ B62J 17/02
2008/0012391 A1 * 1/2008 Nakata ..................... B62J 17/10 296/208
2014/0226350 A1 * 8/2014 Mikura .................... B62J 17/02 362/475
2018/0273128 A1 * 9/2018 Yaffe ...................... B60Q 1/045
2019/0300090 A1 * 10/2019 Yokokawa ............... B62J 17/02
2019/0329833 A1 * 10/2019 Miki ........................ B62J 17/10
2022/0073166 A1 * 3/2022 Nakayama ............... B62J 17/02
2023/0103828 A1 * 4/2023 Ohori ....................... B62J 43/16 180/219
2024/0262444 A1 * 8/2024 Ishii ......................... B62J 17/02
2024/0262445 A1 * 8/2024 Ishii ......................... B62J 17/02
2024/0262446 A1 * 8/2024 Shimizu ................... B62J 6/022
2024/0262447 A1 * 8/2024 Shimizu ................... B62J 17/02
(Continued)

FOREIGN PATENT DOCUMENTS

EP 3 418 168 A1 12/2018
EP 3 546 328 B1 11/2020
(Continued)

OTHER PUBLICATIONS

Computer translation of JP H0976967 (Year: 1997).*
(Continued)

*Primary Examiner* — Gregory A Blankenship
(74) *Attorney, Agent, or Firm* — Stein IP, LLC

(57) ABSTRACT

A cowling structure includes a front cowling covering a vehicle front portion from a front side, and a pair of side cowlings covering the vehicle front portion from lateral sides. The front cowling is fixed to the pair of side cowlings, and is supported by a vehicle body frame via a cowling brace. The pair of side cowlings each include: an outer cowling forming an outer surface of the side cowling, and an inner cowling forming an inner surface of the side cowling. The inner cowling is formed with a front fixing portion fixed to a front side of the vehicle front portion, and a rear fixing portion fixed to a rear side of the vehicle front portion.

8 Claims, 6 Drawing Sheets

(56) References Cited

U.S. PATENT DOCUMENTS

| | | | | |
|---|---|---|---|---|
| 2024/0262449 | A1* | 8/2024 | Ishii | B62J 17/02 |
| 2024/0383556 | A1* | 11/2024 | Shokei | B62J 25/02 |
| 2024/0425132 | A1* | 12/2024 | Ishii | B62J 6/027 |

FOREIGN PATENT DOCUMENTS

| | | | | | |
|---|---|---|---|---|---|
| JP | H0976967 | | * | 3/1997 | B62J 17/02 |
| JP | 2006076498 | A | * | 3/2006 | B62J 17/02 |
| JP | 2010-195254 | A | | 9/2010 | |
| JP | 6806747 | B2 | | 1/2021 | |

OTHER PUBLICATIONS

Computer translation of JP 2006076498 (Year: 2006).*
Extended European Search Report dated Jun. 14, 2024, issued to European Application No. 24154463.4.

* cited by examiner

FR
RE
16
106
95
93
66
15
47
19
18
91
99
101
97
104a
104b
103
102
48
12
46
10
92
11
22
21
98
94
95
66
98
93
94

COWLING STRUCTURE

CROSS-REFERENCE TO RELATED APPLICATIONS

This application is based on and claims priority under 35 USC 119 from Japanese Patent Application No. 2023-014341 filed on Feb. 2, 2023, the entire content of which is incorporated herein by reference.

TECHNICAL FIELD

The present disclosure relates to a cowling structure.

BACKGROUND ART

A cowling structure for a straddle-type vehicle such as a motorcycle is known in which a cowling is supported by a vehicle body frame via a cowling brace (for example, see JP2010-195254A). The cowling brace described in JP2010-195254A 1 extends toward a front side from a head pipe of the vehicle body frame, and the cowling is attached to a bracket provided on the cowling brace. Further, inlet sides of a pair of intake pipes are supported at left and right openings of the cowling, and the outlet sides of the pair of intake pipes are supported by the vehicle body frame on both sides of the head pipe. The cowling is stably supported by the cowling brace and the pair of intake pipes.

However, in a straddle-type vehicle of a full cowl model in which the intake pipe is not connected, it is difficult to stably support a cowling with a simple structure of a cowling brace alone. In order to support the cowling with the cowling brace alone, it is necessary to increase the rigidity of the cowling brace in addition to increasing the size of the cowling brace, which poses a problem that the weight of the cowling brace increases.

SUMMARY OF INVENTION

Aspect of non-limiting embodiments of the present disclosure relates to provide a cowling structure that can stably support a cowling with a simple structure.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a cowling structure including:

- a front cowling covering a vehicle front portion from a front side; and
- a pair of side cowlings covering the vehicle front portion from lateral sides,
- in which the front cowling is fixed to the pair of side cowlings, and is supported by a vehicle body frame via a cowling brace,
- in which the pair of side cowlings each include:
  - an outer cowling forming an outer surface of the side cowling; and
  - an inner cowling forming an inner surface of the side cowling, and
- in which the inner cowling is formed with a front fixing portion fixed to a front side of the vehicle front portion, and a rear fixing portion fixed to a rear side of the vehicle front portion.

BRIEF DESCRIPTION OF DRAWINGS

Exemplary embodiment(s) of the present invention will be described in detail based on the following figures, wherein.

DESCRIPTION OF EMBODIMENTS

A straddle-type vehicle according to one aspect of the present disclosure employs a cowling structure in which a vehicle front portion is covered by a front cowling from a front side, and the vehicle front portion is covered by a pair of side cowlings from lateral sides. The front cowling is fixed to the pair of side cowlings and is supported by a vehicle body frame via a cowling brace. An outer surface of each side cowling is formed by an outer cowlings, and an inner surface of each side cowling is formed by an inner cowlings. The inner cowling is formed with a front fixing portion fixed to a front side of the vehicle front portion, and a rear fixing portion fixed to a rear side of the vehicle front portion. The inner cowlings of the pair of side cowlings are fixed to the vehicle front portion at two positions in the front and rear, and the front cowling is fixed to the pair of side cowlings. The front cowling is supported by the vehicle body frame via the cowling brace, and the front cowling is supported by the vehicle front portion via the pair of side cowlings. Therefore, the front cowling can be stably supported with a simple structure, and the rigidity can be increased without providing an intake pipe and the like. Further, the weight of the cowling brace does not increase since it becomes unnecessary to increase the size and strength of the cowling brace.

(Embodiment)

Figure 1:
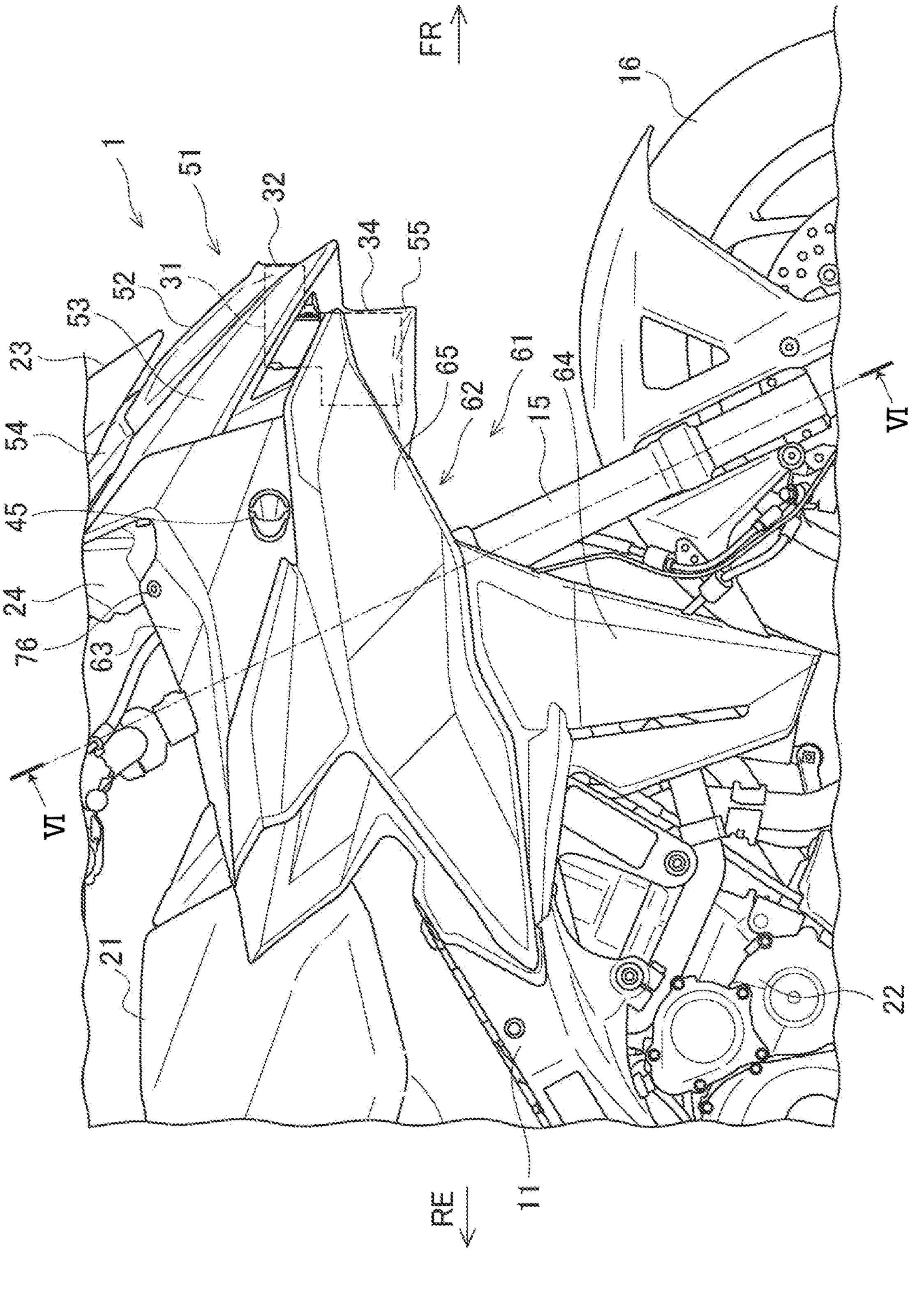
FIG. 1 is a right side view of a vehicle front portion of according to an exemplary embodiment of the present invention.
Figure 2:
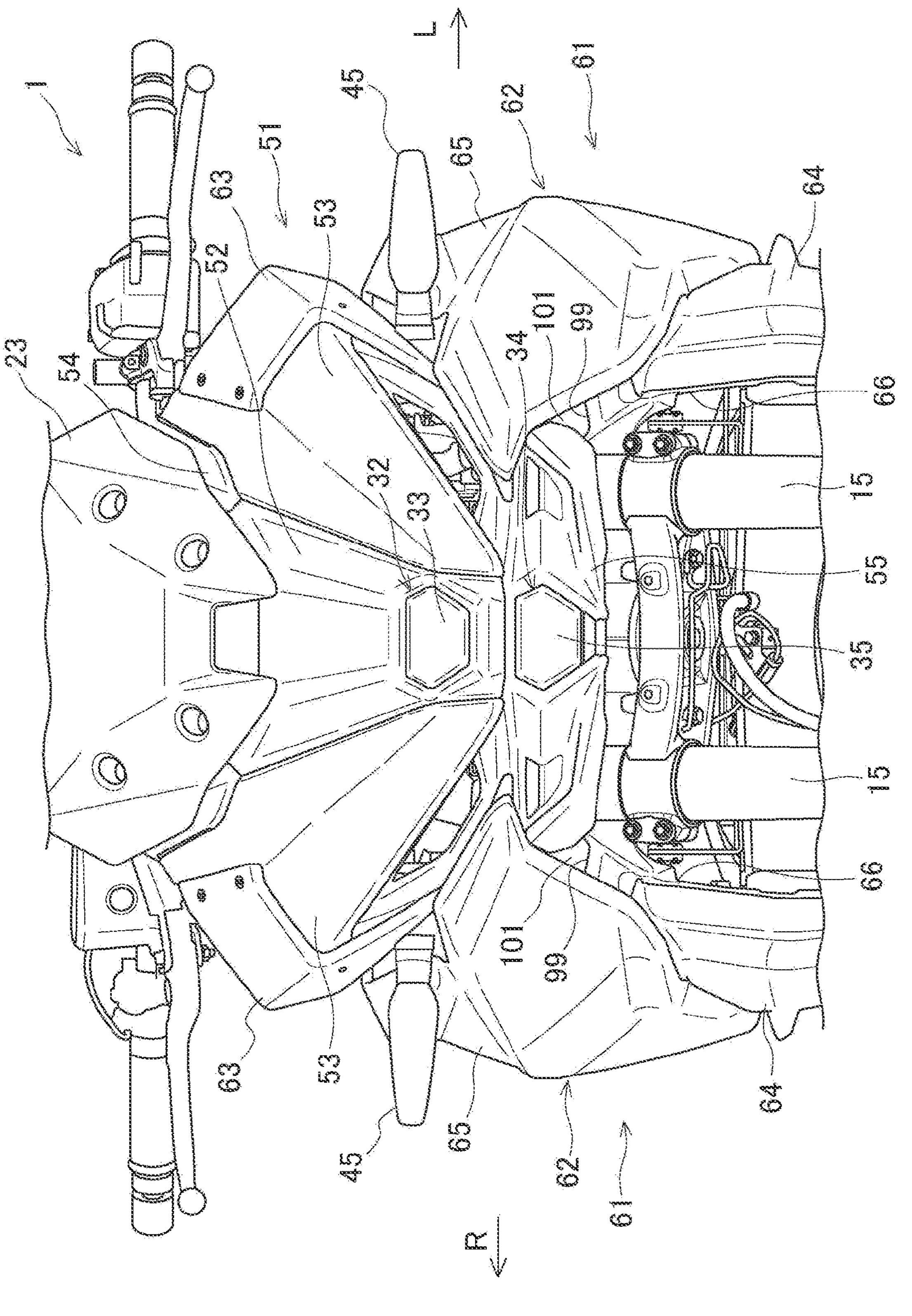
FIG. 2 is a front view of the vehicle front portion of according to an exemplary embodiment of the present invention.

Hereinafter, a cowling structure according to the present embodiment will be described with reference to the accompanying drawings. FIG. 1 is a right side view of a vehicle front portion of the present embodiment. FIG. 2 is a front view of the vehicle front portion of the present embodiment. In the following drawings, an arrow FR indicates a vehicle front side, an arrow RE indicates a vehicle rear side, an arrow L indicates a vehicle left side, and an arrow R indicates a vehicle right side.

As shown in FIG. 1, a front cowling 51 and a pair of side cowlings 61 are provided at the vehicle front portion of a straddle-type vehicle 1. The vehicle front portion is covered by the front cowling 51 from a front side, and the vehicle front portion is covered by the pair of side cowlings 61 from lateral sides. A front fork 15 protrudes toward a lower side from the side cowling 61. A front wheel 16 is rotatably supported at a lower portion of the front fork 15. A main frame 11 protrudes toward a rear side from the side cowling 61, a fuel tank 21 is provided on an upper side of the main frame 11, and an engine 22 is provided on the lower side of the main frame 11.

A front end side of the front cowling 51 is formed into a beak shape in a side view. A front surface of the front cowling 51 is inclined obliquely rearward and upward from a front end, and a windscreen 23 for wind protection is attached to the upper side of the front surface of the front cowling 51. A lower surface of the front cowling 51 is formed in two upper and lower stages, and the lower surface on the rear side is one step lower than the lower surface on the front side of the front cowling 51. A meter cover 24 is attached to the rear side of the front cowling 51. A headlamp unit 31 having an upper headlamp 32 and a lower headlamp 34 is located inside the front cowling 51.

The pair of side cowlings 61 extends toward the rear side from the front cowling 51 to the front side of the fuel tank 21, and extends toward the lower side from the front cowling 51 to the rear side of the front wheel 16. Similarly to the front end side of the front cowling 51, a front end side of each side cowling 61 (outer middle cowling 65) is also formed into a beak shape in side view. The upper side of a front edge of each side cowling 61 is inclined obliquely upward and rearward from a front end. The lower side of the front edge of each side cowling 61 is inclined obliquely downward and rearward from the front end. The pair of side cowlings 61 are connected to the rear side of the front cowling 51, and a streamline shape that reduces air resistance from traveling wind is formed at the vehicle front portion of the straddle-type vehicle 1.

As shown in FIGS. 1 and 2, the center of the front surface of the front cowling 51 is formed by a front center cowling 52, and both left and right sides of the front surface of the front cowling 51 are formed by a pair of front side cowlings 53. The upper side of the front surface of the front cowling 51 is formed by a front upper cowling 54, and the lower side of the front surface of the front cowling 51 is formed by a front lower cowling 55. A lens surface 33 of the upper headlamp 32 is exposed to the front side through an opening of the front center cowling 52. A lens surface 35 of the lower headlamp 34 is exposed to the front side through an opening of the front lower cowling 55.

An outer surface of each of the pair of side cowlings 61 is formed by an outer cowlings 62, and an inner surface of each of the pair of side cowlings 61 is formed by an inner cowlings 66. The outer cowling 62 is formed by combining an outer upper cowling 63, an outer lower cowling 64, and an outer middle cowling 65. A turn signal lamp 45 protrudes laterally from the outer upper cowling 63. The outer cowling 62 and the inner cowling 66 are overlapped in a left-right direction to form each side cowling 61 hollow. A space for accommodating electrical components is positioned inside each side cowling 61.

Although the front cowling 51 is supported by a vehicle body frame 10 via a cowling brace 19 (see FIG. 3), it is difficult to sufficiently support the front cowling 51 only with the cowling brace 19. In order to support the entire front cowling 51 only with the cowling brace 19, it is necessary to increase the size of the cowling brace 19 and to increase the rigidity of the cowling brace 19. Therefore, in the straddle-type vehicle 1 according to the present embodiment, the front cowling 51 is supported on the vehicle body frame 10 via the cowling brace 19, and the front cowling 51 is supported at the vehicle front portion via the pair of side cowlings 61.

Figure 3:
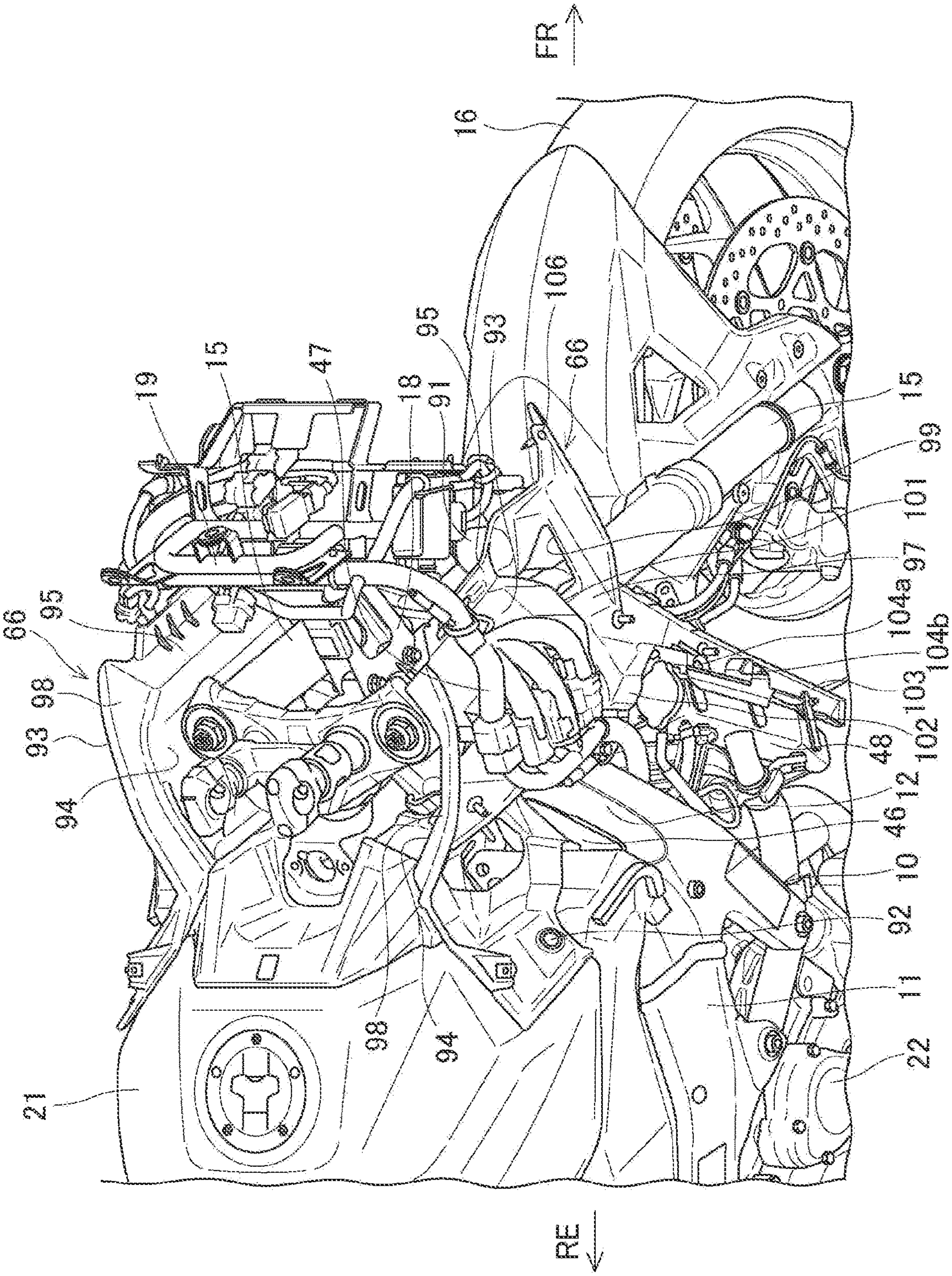
FIG. 3 is a perspective view showing an internal structure of the vehicle front portion of according to an exemplary embodiment of the present invention.
Figure 4:
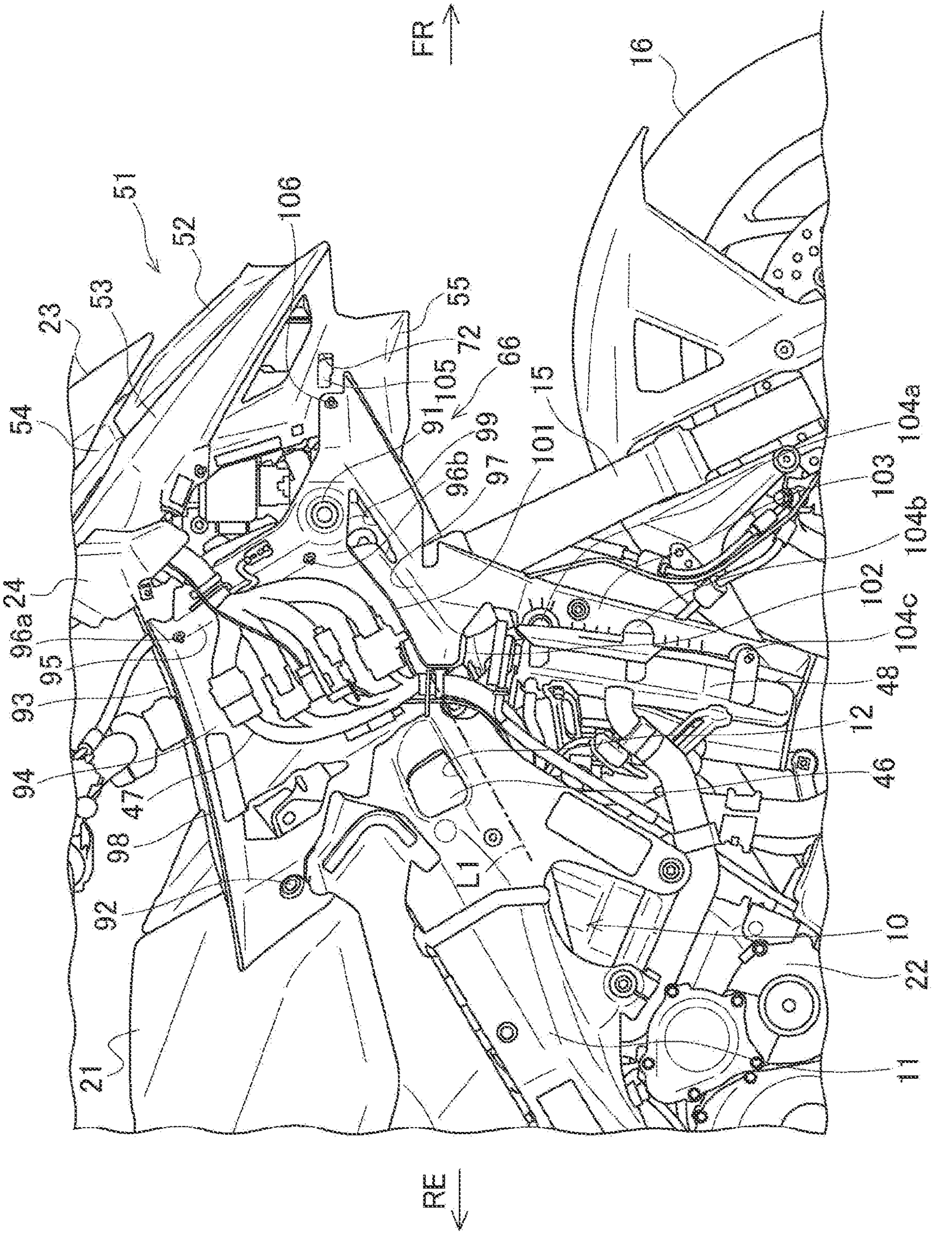
FIG. 4 is a right side view in which a part of a cowling is removed from the vehicle front portion of according to an exemplary embodiment of the present invention.
Figure 5:
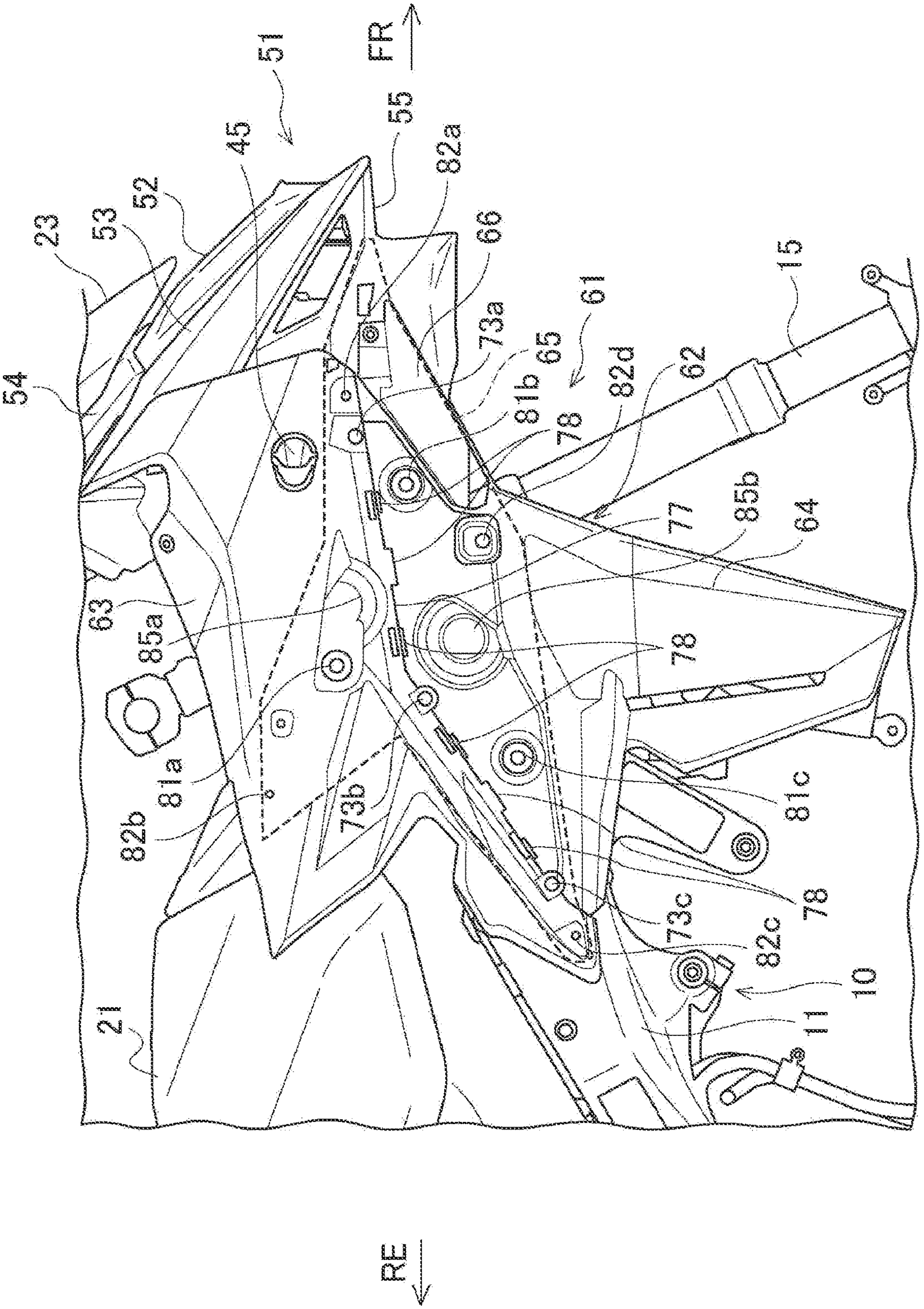
FIG. 5 is a right side view in which a part of the cowling is removed from the vehicle front portion of according to an exemplary embodiment of the present invention.

The cowling structure will be described with reference to FIGS. 3 to 5. FIG. 3 is a perspective view showing an internal structure of the vehicle front portion of the present embodiment. FIGS. 4 and 5 are right side views in which a part of the cowling is removed from the vehicle front portion of the present embodiment. FIG. 3 shows a state in which the front cowling and the outer cowling are removed, and FIG. 4 shows a state in which the outer cowling is removed. In FIG. 5, the outer middle cowling is indicated by a two-dot chain line.

As shown in FIG. 3, a cowling brace 19 is supported by a front portion of a vehicle body frame 10 via a brace bracket 18. The cowling brace 19 is formed by integrating a metal pipe and a metal bracket by welding. The headlamp unit 31 (see FIG. 1) and the front cowling 51 (see FIG. 1) are supported by the front side of the cowling brace 19. Tubular front fixing portions 91 protruding toward an inner side in the vehicle width direction from front sides of the pair of inner cowling 66 are respectively screwed to left and right sides of the cowling brace 19. The pair of inner cowlings 66 are connected to each other via the cowling brace 19.

The rear sides of positions along front edges of the pair of inner cowlings 66 bulge toward the inner side in the vehicle width direction. A side wall 94 of a bulging portion 93 of each inner cowling 66 is curved in an arch shape in a top view not to interfere with the front fork 15. More specifically, the side wall 94 of the bulging portion 93 curves toward an outer side in the vehicle width direction from a front end to an intermediate portion, and the side wall 94 of the bulging portion 93 curves toward the inner side in the vehicle width direction from the intermediate portion to a rear end. Accordingly, even when the front fork 15 swings, a distance between the front fork 15 and the bulging portion 93 of the inner cowling 66 is appropriately maintained. A rear fixing portion 92 located on the rear side of the bulging portion 93 is screwed to the fuel tank 21.

As shown in FIGS. 3 and 4, the bulging portion 93 having a rectangular shape in a side view is located on the rear side than the front cowling 51, a front wall 95 of the bulging portion 93 is inclined obliquely upward to the rear side, and a lower wall 97 of the bulging portion 93 is inclined obliquely downward to the rear side. The ventilation hole 99 is formed on the front side of the lower wall 97 of the bulging portion 93. Traveling wind passing through the lower side of the front cowling 51 blows toward the rear side through the ventilation hole 99. Even in a case where the lower wall 97 of the bulging portion 93 is inclined obliquely downward to the rear side, since the traveling wind blows toward the rear side through the ventilation hole 99, upward force is less likely to be generated at the vehicle front portion. Since the front fixing portion 91 is positioned directly above the ventilation hole 99, vibration when traveling wind passes through the ventilation hole 99 is reduced.

The inner cowling 66 is formed with a wind guide wall 101 extending obliquely rearward to the rear side from an upper edge of the ventilation hole 99. The wind guide wall 101 is inclined at a shallow angle with respect to a horizontal direction, and even in a case where traveling wind flows in the horizontal direction from the ventilation hole 99, the traveling wind does not hit the wind guide wall 101 strongly. The wind guide wall 101 smoothly guides the traveling wind that has entered the ventilation hole 99 rearward, thereby reducing air resistance that the inner cowling 66 receives from the traveling wind. In addition, the wind guide wall 101 is positioned at the back of the ventilation hole 99 in a front view, and the inside of the inner cowling 66 is hidden by the wind guide wall 101, so that appearance is improved (see FIG. 2).

An opening 12 connected to an inlet 46 of an air cleaner (not shown) is formed in a front portion of the main frame 11. The wind guide wall 101 extends from the ventilation hole 99 toward the inlet 46 of the air cleaner, and the wind guide wall 101 guides traveling wind to the inlet 46 of the air cleaner, thereby improving air intake efficiency. In this case, in a side view, an extension line L1 obtained by extending a downstream wall surface of the wind guide wall 101 is located on the lower side of the inlet 46 of the air cleaner. By the traveling wind passing through the wind guide wall 101, a direction of the traveling wind is directed downward than the inlet 46 of the air cleaner, and intrusion of foreign matters such as sand into the inlet 46 of the air cleaner is reduced.

An accommodation space for electrical components is formed inside the bulging portion 93 of the inner cowling 66. A harness 47 is installed as an electrical component in the accommodation space. The wind guide wall 101 extends to separate the accommodation space and a flow path of the traveling wind entering from the ventilation hole 99. Thus, even in a case where foreign matters such as sand or water droplets enter from the ventilation hole 99, the harness 47 is protected from the foreign matters by the wind guide wall 101. The outer cowling 62 (see FIG. 1) is superposed on the inner cowling 66, and rigidity of the side cowling 61 is increased by a hollow closed section. The harness 47 is hidden inside the side cowling 61, so that the appearance is improved, and the harness 47 is protected from flying stones or the like.

An upper wall 98 protrudes toward the outer cowling 62 from an upper end of the side wall 94 of the inner cowling 66 (bulging portion 93). The upper wall 98 of the inner cowling 66 extends in a front-rear direction similarly to the wind guide wall 101, and the upper wall 98 of the inner cowling 66 and the wind guide wall 101 face each other in an upper-lower direction. The inner cowling 66 is reinforced by a concave cross section formed by the upper wall 98, the wind guide wall 101, and the side wall 94 of the inner cowling 66, and the rigidity of the inner cowling 66 is increased. In this way, the wind guide wall 101 not only guides the traveling wind, but also functions as a separation wall that separates the accommodation space and the flow path, and a rib that reinforces the bulging portion 93.

A radiator 48 is provided on the lower side of the vehicle front portion, and a partition wall 102 protrudes from the side wall 94 of the inner cowling 66 toward the outer cowling 62 to partition the inside of the inner cowling 66 and the upper side of the radiator 48. Hot air flowing upward from the radiator 48 is blocked by the partition wall 102, and therefore, heat damage to the harness 47 installed in the inner cowling 66 is reduced. Although the partition wall 102 of the inner cowling 66 is connected to a rear end of the wind guide wall 101 and partially blocks the flow path of the traveling wind, an amount of protrusion of the partition wall 102 is reduced to the minimum so that a flow of the traveling wind is not strongly blocked.

An extending portion 103 extends downward from the bulging portion 93 of the inner cowling 66, and the lower fixing portions 104*a* to 104*c* of the extending portion 103 are screwed to the radiator 48. The front fixing portions 91, the rear fixing portions 92, and the lower fixing portions 104*a* to 104*c*, which are spaced apart in the front-rear and upper-lower directions of the inner cowling 66, are screwed to the vehicle front portion, thereby stably supporting the side cowling 61. The extending portion 103 extends along a side surface of the radiator 48, in front of the radiator 48. The extending portion 103 functions as a wind guide plate configured to guide traveling wind to the radiator 48, and cooling efficiency is improved by the traveling wind flowing to the radiator 48 along the extending portion 103.

The front cowling 51 is formed by three-dimensionally combining cowling members of the front center cowling 52, the pair of front side cowlings 53, the front upper cowling 54, and the front lower cowling 55. The adjacent cowling members are clipped to each other. Further, the meter cover 24 is clipped to the pair of the front side cowlings 53 and the front upper cowling 54. The front wall 95 of the bulging portion 93 of the inner cowling 66 is in contact with the meter cover 24, and two upper and lower portions 96*a* and 96*b* of the front wall 95 of the bulging portion 93 are clipped to the meter cover 24.

An insertion hole 72 is formed in the front lower cowling 55. A hook 105 is formed in the inner cowling 66. The hook 105 is inserted into the insertion hole 72, and the front lower cowling 55 and the inner cowling 66 are latched. The vicinity of a tip end of the inner cowling 66 is in contact with the front lower cowling 55, and a tip end portion 106 of the inner cowling 66 is clipped to the front lower cowling 55. The outer upper cowling 63 (see FIG. 1) is in contact with the meter cover 24, and a front portion 76 (see FIG. 1) of the outer upper cowling 63 is screwed to the meter cover 24.

Thus, an upper portion of the front cowling 51 is fixed to the front wall 95 of the bulging portion 93 and to the front portion 76 of the outer cowling 62, via the meter cover 24. A lower portion of the front cowling 51 is fixed to the tip end portion 106 of the inner cowling 66. Since the pair of side cowlings 61 are supported at a plurality of positions in the vehicle front portion, the pair of side cowlings 61 function as a support structure of the front cowling 51 together with the cowling brace 19. As described above, the rigidity of the pair of side cowlings 61 is sufficiently increased, so that the front cowling 51 is stably supported by the pair of side cowlings 61.

As shown in FIG. 5, the outer upper cowling 63 and the outer lower cowling 64 are attached to the inner cowling 66. The outer upper cowling 63 faces an upper region of the inner cowling 66. The outer lower cowling 64 faces a lower region of the inner cowling 66. A lower edge of the outer upper cowling 63 is connected to an upper edge of the outer lower cowling 64. The outer middle cowling 65 is attached to cover a joint 77 between the outer upper cowling 63 and the outer lower cowling 64, from the outer side in the vehicle width direction.

A plurality of hooks (not shown) are formed at the lower edge of the outer upper cowling 63. A plurality of insertion holes 78 are formed at the upper edge of the outer lower cowling 64. The hooks are inserted into the insertion holes 78 to latch the outer upper cowling 63 and the outer lower cowling 64. Fixing portions 73*a* to 73*c* are formed at three positions spaced apart in an extending direction at the lower edge of the outer upper cowling 63. The fixing portions 73*a* to 73*c* at the three positions are screwed to the upper edge of the outer lower cowling 64. The outer upper cowling 63 and the outer lower cowling 64 are connected at a plurality of positions along the joint 77.

A clip hole 81*a* is formed in the middle of the outer upper cowling 63 in the front-rear direction. A clip hole 81*b* is formed on the front side of the outer lower cowling 64 in the front-rear direction. A clip hole 81*c* is formed on the rear side of the outer lower cowling 64 in the front-rear direction. Three clips (not shown) corresponding to the clip holes 81*a* to 81*c* are provided on an inner surface of the outer middle cowling 65. The clips of the outer middle cowling 65 are inserted into the clip holes 81*a* to 81*c* of the outer upper cowling 63 and the outer lower cowling 64 from the outer side in the vehicle width direction to position the outer middle cowling 65.

Fixing portions 82*a* to 82*d* corresponding to the front side, the rear side, the upper side, and the lower side of the outer middle cowling 65 are formed in the outer upper cowling 63 and the outer lower cowling 64. The fixing portion 82*a* is located in front of the clip hole 81*b*. The fixing portion 82*b* is located above the clip hole 81*a*. The fixing portion 82*c* is located behind the clip hole 81*c*. The fixing portion 82*d* is located below a straight line passing through the clip holes 81*b* and 81*c*. The outer middle cowling 65 is screwed to the four fixing portions 82*a* to 82*d* of the outer upper cowling 63 and the outer lower cowling 64.

The joint 77 between the outer upper cowling 63 and the outer lower cowling 64 is covered with the outer middle cowling 65 to improve the appearance of the straddle-type vehicle 1. In this case, the outer upper cowling 63 and the outer lower cowling 64 are screwed to the outer middle cowling 65 from the inner side in the vehicle width direction. No screw holes pass through the outer middle cowling 65, and fastening members of the cowling members are not exposed to the outside. By assembling the outer cowling 62 in advance, the work of attaching the outer cowling 62 to the inner cowling 66 becomes easier.

Further, although there is a gap at the joint 77 between the outer upper cowling 63 and the outer lower cowling 64, the gap is covered by the outer middle cowling 65, so that an allowable width of the gap is widened. The fixing portion 82*b* at a fixing position of the outer upper cowling 63 and the outer middle cowling 65, and the fixing portion 82*d* at a fixing position of the outer lower cowling 64 and the outer middle cowling 65, are positioned at an opposite side with respect to the joint 77. Two portions spaced apart in the upper-lower direction of the outer upper cowling 63 and the outer lower cowling 64 are connected to each other via the outer middle cowling 65, thereby increasing the overall rigidity of the outer cowling 62.

The outer upper cowling 63 and the outer lower cowling 64 are manufactured by injection molding in which a mold is filled with molten resin. Therefore, gate marks 85*a* and 85*b* remain on the outer upper cowling 63 and the outer lower cowling 64. The gate marks 85*a* and 85*b* are covered with the outer middle cowling 65. Since the gate marks 85*a* and 85*b* are hidden by the outer middle cowling 65, the gate at the time of injection molding is increased in size to improve the degree of freedom in design without considering the influence on the appearance of the outer upper cowling 63 and the outer lower cowling 64.

Figure 6:
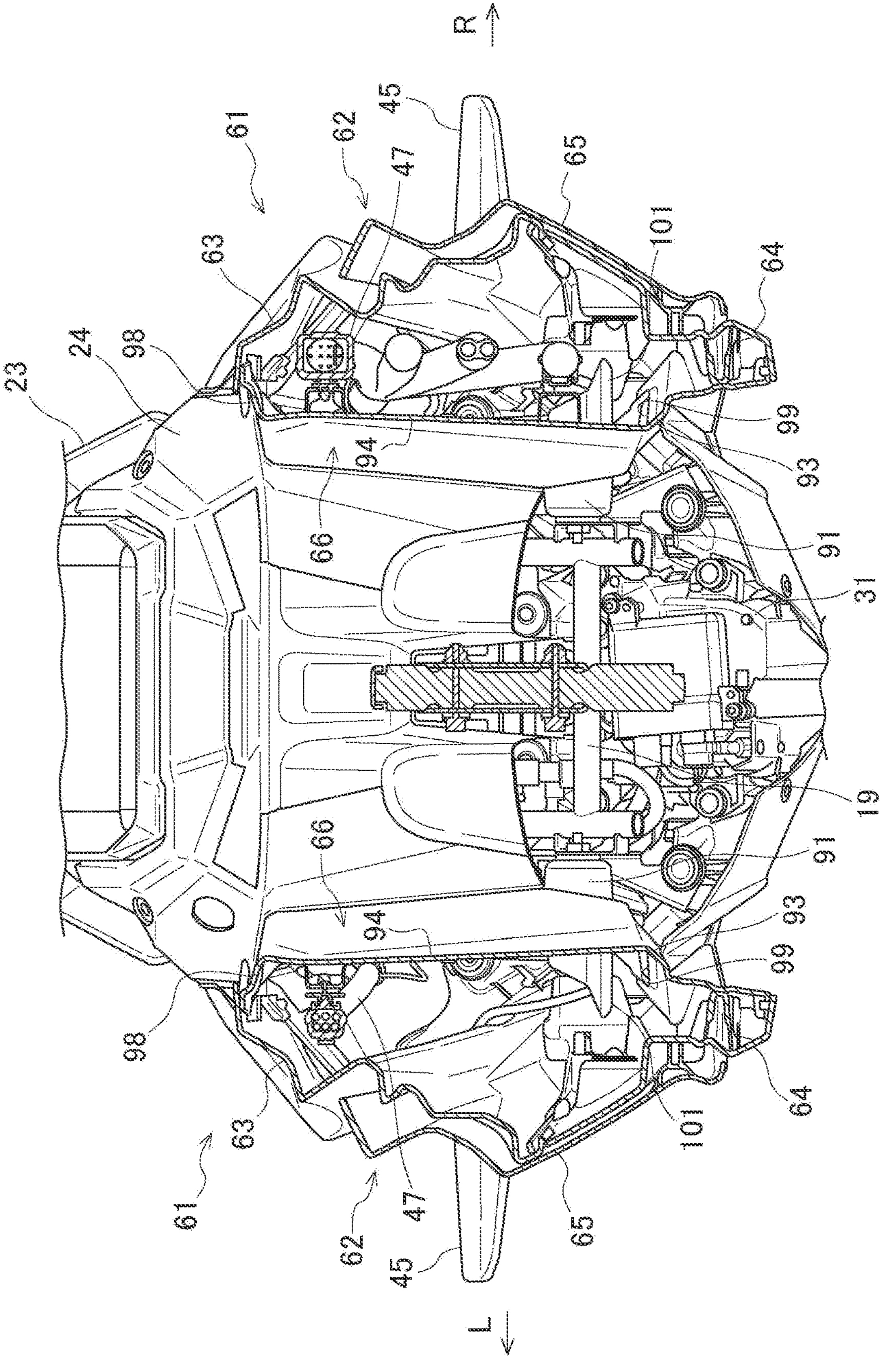
FIG. 6 is a cross-sectional view of the vehicle front portion in FIG. 1 taken along a line VI-VI.

A fixing structure of the cowling will be described with reference to FIGS. 4 and 6. FIG. 6 is a cross-sectional view of the vehicle front portion in FIG. 1 taken along a line VI-VI.

As shown in FIG. 4, the front fixing portion 91 of the inner cowling 66 is screwed to the cowling brace 19 (see FIG. 6), and the rear fixing portion 92 of the inner cowling 66 is screwed to the fuel tank 21. Further, the lower fixing portions 104*a*-104*c* of the inner cowling 66 are screwed to the radiator 48. An upper side of the front cowling 51 is clipped to the front wall 95 of the bulging portion 93. A lower side of the front cowling 51 is clipped to the tip end portion 106 of the inner cowling 66. The front cowling 51 is connected to the fuel tank 21 and the radiator 48, via not only the cowling brace 19 but also the inner cowling 66.

As shown in FIG. 6, the rigidity of the side cowling 61 is increased by a hollow structure in which the outer cowling 62 is fixed to the inner cowling 66. As described above, the inner cowling 66 is formed with a concave cross section by the side wall 94, the upper wall 98, and the wind guide wall 101, and the rigidity is increased. Further, the outer cowling 62 is formed by combining the outer upper cowling 63, the outer lower cowling 64, and the outer middle cowling 65, and the rigidity is increased. Since the rigidity of each side cowling 61 is increased, the front cowling 51 is stably supported by the cowling brace 19 and the pair of side cowlings 61.

As described above, according to the cowling structure of the present embodiment, the inner cowlings 66 of the pair of side cowlings 61 are fixed to the vehicle front portion at multiple positions spaced apart in the front-rear and upper-lower directions, and the front cowling 51 is fixed to the pair of side cowlings 61. The front cowling 51 is supported by the vehicle body frame 10 via the cowling brace 19, and the front cowling 51 is supported on the vehicle front portion via the pair of side cowlings 61. Therefore, the front cowling 51 can be stably supported with a simple structure and the rigidity can be increased without providing an intake pipe and the like. Further, the weight of the cowling brace 19 does not increase since it becomes unnecessary to increase the size and strength of the cowling brace 19.

In the present embodiment, the front cowling is formed by combining a plurality of cowling members. Alternatively, the front cowling may be formed by one cowling member.

Further, in the present embodiment, the outer cowling is formed by combining a plurality of cowling members. Alternatively, the outer cowling may be formed by one cowling member.

Further, in the present embodiment, the front fixing portion of the inner cowling is fixed to the cowling brace. Alternatively, the front fixing portion of the inner cowling may be fixed to the front side of the vehicle front portion. For example, the front fixing portion of the inner cowling may be fixed to a lamp unit.

Further, in the present embodiment, the rear fixing portion of the inner cowling is fixed to the fuel tank. Alternatively, the rear fixing portion of the inner cowling may be fixed to the rear side of the vehicle front portion. For example, the rear fixing portion of the inner cowling may be fixed to a tank cover.

Further, in the present embodiment, the lower fixing portion of the inner cowling is fixed to the radiator. Alternatively, the lower fixing portion of the inner cowling may be fixed to the lower side of the vehicle front portion. For example, the lower fixing portion of the inner cowling may be fixed to the vehicle body frame, the engine and the like via a bracket or the like.

Further, in the present embodiment, the inner cowling is reinforced with a concave cross section, and a shape of the cross section of the inner cowling is not particularly limited.

Further, in the present embodiment, the accommodation space for the harness is formed in the inner cowling. Alternatively, an electrical component other than the harness may be accommodated in the accommodation space of the inner cowling.

Further, a fixing method of the various cowlings is not particularly limited, and fixing methods such as screwing, latching, clipping, and the like may be used as appropriate.

Further, the cowling structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, a first aspect relates to a cowling structure including: a front cowling covering a vehicle front portion from a front side, and a pair of side cowlings covering the vehicle front portion from lateral sides, in which the front cowling (51) is fixed to a pair of side cowlings (61), and is supported on a vehicle body frame (10) via a cowling brace (19), the pair of side cowlings each includes: an outer cowling (62) forming an outer surface of the side cowling; and an inner cowling (66) forming an inner surface of the side cowling, and the inner cowling is formed with a front fixing portion (91) fixed to a front side of the vehicle front portion, and a rear fixing portion (92) fixed to a rear side of the vehicle front portion. According to this configuration, the inner cowlings of the pair of side cowlings are fixed to the vehicle front portion at two positions in the front and rear, and the front cowling is fixed to the pair of side cowlings. The front cowling is supported by the vehicle body frame via the cowling brace, and the front cowling is supported by the vehicle front portion via the pair of side cowlings. Therefore, the front cowling can be stably supported with a simple structure, and the rigidity can be increased without providing an intake pipe and the like. Further, the weight of the cowling brace does not increase since it becomes unnecessary to increase the size and strength of the cowling brace.

A second aspect is directed to the first aspect, in which a pair of upper and lower facing walls (upper wall 98, wind guide wall 101) protrudes from a side wall (94) of the inner cowling toward the outer cowling, the pair of upper and lower facing walls extend in a front-rear direction, and the inner cowling is reinforced by a concave cross section formed by the pair of upper and lower facing walls and the side wall. According to this configuration, the rigidity of the inner cowling is increased by the concave cross section, and the front cowling is stably supported by the inner cowling.

A third aspect is directed to the first aspect and the second aspect, in which the inner cowling and the outer cowling are overlapped to form the side cowling hollow. According to this configuration, the rigidity of the side cowling is increased by the hollow closed section, and the front cowling is stably supported by the inner cowling. Various components such as the harness are hidden inside the side cowling, so that the appearance is improved, and the various components are protected from flying stones or the like.

A fourth aspect is directed to any one of the first aspect to the third aspect, in which the inner cowling is formed with a lower fixing portion (104*a* to 104*c*) fixed to a lower side of the vehicle front portion. According to this configuration, the pair of side cowlings can be more stably supported by fixing the inner cowling to the vehicle front portion at three positions spaced apart in the front-rear and upper-lower directions.

A fifth aspect is directed to the fourth aspect, in which the inner cowling extends along a side surface of a radiator (48), in front of the radiator, and the lower fixing portion formed on an extending portion (103) of the inner cowling is fixed to the radiator on the lower side of the vehicle front portion. According to this configuration, the extending portion guides the traveling wind toward the radiator, thereby improving the cooling efficiency of the radiator.

A sixth aspect is directed to the fifth aspect, in which a partition wall (102) protrudes from a side wall of the inner cowling toward the outer cowling to separate an inside of the inner cowling and an upper side of the radiator. According to this configuration, the partition wall can block the hot air flowing upward from the radiator. When various components such as the harness are installed inside the inner cowling, heat damage to the various components can be reduced.

Although the present embodiment has been described, as another embodiment, the above-described embodiment and modification may be combined entirely or partially.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A cowling structure comprising:
- a front cowling covering a vehicle front portion from a front side; and
- a pair of side cowlings covering the vehicle front portion from lateral sides,
- wherein the front cowling is fixed to the pair of side cowlings, and is supported by a vehicle body frame via a cowling brace,
- wherein the pair of side cowlings each include:
  - an outer cowling forming an outer surface of the side cowling; and
  - an inner cowling forming an inner surface of the side cowling, and
- wherein the inner cowling is formed with a front fixing portion fixed to a front side of the vehicle front portion, and a rear fixing portion fixed to a rear side of the vehicle front portion.

2. The cowling structure according to claim 1,
- wherein a pair of upper and lower facing walls protrudes from a side wall of the inner cowling toward the outer cowling,
- wherein the pair of upper and lower facing walls extend in a front-rear direction, and
- wherein the inner cowling is reinforced by a concave cross section formed by the side wall and the pair of upper and lower facing walls.

3. The cowling structure according to claim 1,
- wherein the inner cowling and the outer cowling are overlapped to form a side cowling hollow.

4. The cowling structure according to claim 1,
- wherein the inner cowling is formed with a lower fixing portion fixed to a lower side of the vehicle front portion.

5. The cowling structure according to claim 4,
- wherein the inner cowling extends along a side surface of a radiator, in front of the radiator, and
- wherein the lower fixing portion formed on an extending portion of the inner cowling is fixed to the radiator on the lower side of the vehicle front portion.

6. The cowling structure according to claim 1,
- wherein the front fixing portion protrudes toward an inner side in the vehicle width direction from front sides of the inner cowling and the front fixing portion is screwed to the cowling brace.

7. The cowling structure according to claim 3, wherein an accommodation space for electrical components is formed inside a bulging portion of the inner cowling, and wherein a harness is installed as an electrical component in the accommodation space.

8. A cowling structure comprising:

a front cowling covering a vehicle front portion from a front side; and a pair of side cowlings covering the vehicle front portion from lateral sides, wherein the front cowling is fixed to the pair of side cowlings, and is supported by a vehicle body frame via a cowling brace, wherein the pair of side cowlings each include:

an outer cowling forming an outer surface of the side cowling; and an inner cowling forming an inner surface of the side cowling, wherein the inner cowling is formed with a front fixing portion fixed to a front side of the vehicle front portion, and a rear fixing portion fixed to a rear side of the vehicle front portion wherein the inner cowling is formed with a lower fixing portion fixed to a lower side of the vehicle front portion, wherein the inner cowling extends along a side surface of a radiator, in front of the radiator, wherein the lower fixing portion formed on an extending portion of the inner cowling is fixed to the radiator on the lower side of the vehicle front portion, and wherein a partition wall protrudes from a side wall of the inner cowling toward the outer cowling to separate an inside of the inner cowling and an upper side of the radiator.

* * * * *